United States Patent [19]
Larson

[11] 3,827,664
[45] Aug. 6, 1974

[54] TISSUE BOX HOLDER FOR AUTOMOBILES
[76] Inventor: Perley E. Larson, 8408 191st S. W., Edmonds, Wash. 98020
[22] Filed: Oct. 24, 1972
[21] Appl. No.: 299,718

[52] U.S. Cl. ...... 248/311, 224/42.1 C, 224/42.45 R, 248/DIG. 5
[51] Int. Cl. ............................................. B60r 7/00
[58] Field of Search ...... 248/DIG. 5, 311, 313, 318, 248/302, 204, 205 R; 206/19.5 R; 221/45, 46, 300; 220/85 H; 224/42.1 C, 9.1, 42.45 R, 42.46 R, 45 W, 45 F, 45 P; 211/31, 50, 106, 119, 181

[56] References Cited
UNITED STATES PATENTS

| | | | |
|---|---|---|---|
| 909,497 | 1/1909 | Williams | 211/50 |
| 909,498 | 1/1909 | Williams | 211/50 |
| 1,417,215 | 5/1922 | Syrett | 248/DIG. 5 |
| 2,185,299 | 6/1938 | Heraty | 211/50 |
| 3,046,049 | 7/1962 | Paxton | 211/31 X |
| 3,288,416 | 11/1966 | Franklin | 248/311 |

FOREIGN PATENTS OR APPLICATIONS
19,141 10/1893 Great Britain ..................... 211/31

Primary Examiner—Ramon S. Britts
Assistant Examiner—Thomas J. Holko
Attorney, Agent, or Firm—Wells, St. John & Roberts

[57] ABSTRACT

A length of spring wire is bent to provide a mounting support having two slightly diverging arms, which then diverge sharply in a common plane to downwardly bent parallel portions at right angles to the common plane of said arms forwardly extended parallel portions at right angles to the downwardly bent portions, upwardly extended parallel portions at the forward end of said forwardly extended portions and free end portions extended toward each other from the top of the upwardly extended portions and terminating in safety curls to engage and press a box of tissue resting on said forwardly extended portions against the downwardly bent portions.

1 Claim, 3 Drawing Figures

PATENTED AUG 6 1974 3,827,664

TISSUE BOX HOLDER FOR AUTOMOBILES

BACKGROUND OF THE INVENTION

The development of an adequate, safe means to hold a box of tissues in the front of an automobile where it can be reached by all people riding in the front seat has been the subject of several prior patents. Recent patents for this purpose are the U.S. Pats. to Franklin, No. 3,288,416 and to Roll, No. 3,292,889. These patents show how holders may be mounted between the strip molding that holds the front edge of the ceiling lining of the automobile or held by the rear-view mirror bracket. Another earlier U.S. Pat. to Webber, No. 2,503,859 shows an all wire holder which can serve a like purpose.

Other prior art found in a novelty search in this field comprises the following U.S. Pats.:, No. 1,724,428 and 1,883,008 both to Sherman; No. 2,470,890 to Goodpasture; No. 2,460,906 to Schmiedeberg; No. 2,626,119 to Crosby; No. 2,678,184 to Erdody; and, No. 3,258,238 to Grafton.

The purpose of the present invention is to provide a simple one-piece spring wire tissue box holder into which the tissue box can be readily inserted and when inserted, is held securely against accidental dislodgement and is readily accessible for downward removal of the tissues therein.

DESCRIPTION OF A PREFERRED FORM OF THE INVENTION

Figure 1:
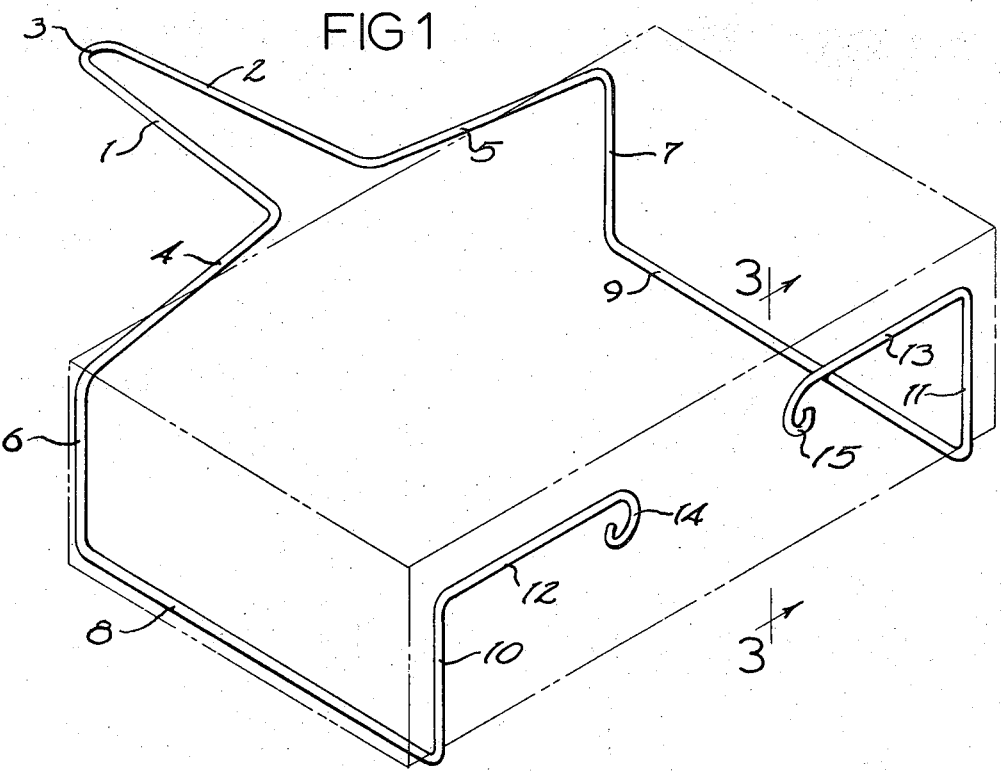
FIG. 1 is a perspective view of the tissue box holder embodying my invention with the tissue box indicated therein by dash-dot lines.
Figure 2:
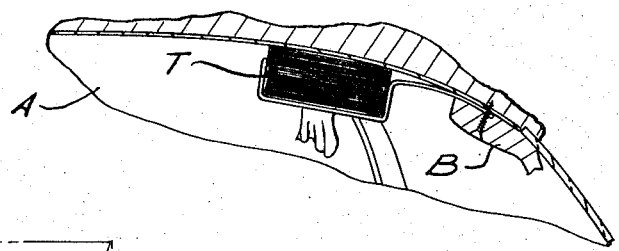
FIG. 2 is a fragmentary sectional view through the automobile roof, the holder and the tissue box as it is mounted in the automobile.

My invention as illustrated by the drawings, comprises a length of spring wire which is bent midway of its ends to provide two arms 1 and 2 which are close together but diverge slightly from each other, from the short bent portion 3. The arms 1 and 2 and the portion 3 provide a mounting portion that can be placed beneath a bracket B for a rear view mirror of an automobile body A. The arms 1 and 2 continue at 4 and 5 as widely diverging portions of the spring wire. All of the portions 1 to 5 lie in a common plane but can be sprung as shown to insert a tissue box T in the holder beneath the roof of the automobile.

At the outer ends of the portions 4 and 5, the wire has downwardly directed portions 6 and 7 which extend substantially at right angles to the plane of the portions 1-5 and are generally parallel to each other. Parallel support portions 8 and 9 project from the lower ends of portions 6 and 7 away from the portions 1-5. At the front ends of portions 8 and 9 are upturned portions 10 and 11 which are substantially parallel to portions 6 and 7 and of about the same height so they extend up to the plane of the portions 1-5.

Figure 3:
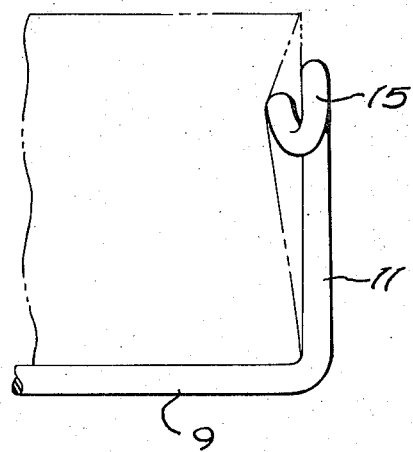
FIG. 3 is a fragmentary view taken on the line 3—3 of FIG. 1, the tissue box being indicated by dot-dash lines.

At the tops of the portions 10 and 11, free end portions 12 and 13 of the wire extend toward each other and are provided with downturned safety curls at their adjacent ends. These curls 14 and 15 are directed at slight angles toward the downturned portions 6 and 7 so as to press against the box T as shown in FIG. 3. The function of these safety curls is indentation of the box T so as to act as locks to prevent accidental movement of the box T crosswise of the car, or upward out of the holder.

The invention to which an exclusive right is claimed, is defined as follows:

1. A tissue box holder for a rectangular tissue box having a fixed length, width, and depth, said holder being adapted to support the box in automobiles, comprising a length of spring wire having:

a mid-portion adapted to be secured to the automobile interior comprising two arm portions joined by a sharp curve and diverging forwardly in a common plane;

downturned portions extending from the ends of the arm portions in a plane at a substantially right angle to the first named plane;

parallel forwardly extended portions extending in a plane at a right angle to the plane of said downturned portions, each being of a length equal to the box width;

upwardly extended portions at the forward ends of said parallel forwardly extended portions and lying in a plane parallel to the plane of the downturned portions, each being of a length less than the box depth;

free end portions extended toward each other from the top of the upwardly extended portions and terminating at locations spaced from one another; and safety downturned curls on said end portion operable to engage and press a tissue box resting on said forwardly extended portions toward the downturned portions;

said safety curls having ends that project angularly toward the plane of the downturned portions and downwardly to resist endwise and upward movement of a tissue box resting on the forwardly extended portions.

* * * * *